United States Patent [19]
Kerko et al.

[11] Patent Number: 5,244,845
[45] Date of Patent: Sep. 14, 1993

[54] MULTIPURPOSE PHOTOCHROMIC BROWN GLASSES

[75] Inventors: David J. Kerko; David W. Morgan, both of Corning, N.Y.

[73] Assignee: Corning Incorporated, Corning, N.Y.

[21] Appl. No.: 955,695

[22] Filed: Oct. 2, 1992

[51] Int. Cl.$^5$ .......................... C03C 3/11; C03C 4/06
[52] U.S. Cl. ........................... 501/13; 501/56; 501/67; 351/166; 428/913
[58] Field of Search ................ 501/13, 56, 67; 428/913; 351/166

[56] References Cited

U.S. PATENT DOCUMENTS

| | | | |
|---|---|---|---|
| 3,208,860 | 9/1965 | Armistead et al. | 106/54 |
| 4,043,781 | 8/1977 | DeMunn et al. | 65/30 |
| 4,251,278 | 2/1981 | Hares | 106/47 |
| 4,608,349 | 8/1986 | Kerko et al. | 501/13 |
| 4,757,034 | 7/1988 | Prassas | 501/13 |
| 4,793,703 | 12/1988 | Fretz, Jr. | 351/163 |
| 5,023,209 | 6/1991 | Grateau et al. | 501/13 |

Primary Examiner—Karl Group
Attorney, Agent, or Firm—M. M. Peterson

[57] ABSTRACT

A composition for a photochromic glass consisting essentially of, in approximate calculated weight percent, about:

| | | | |
|---|---|---|---|
| $SiO_2$ | 54–58% | Ag | 0.18–0.33% |
| $B_2O_3$ | 18–22% | Cl | 0.25–0.50% |
| $Al_2O_3$ | 7–8% | Br | 0.04–0.12% |
| $Li_2O$ | 3.75–4.5% | CuO | 0.007–0.012% |
| $Na_2O$ | 0–1% | PbO | 0–0.08% |
| $K_2O$ | 5.5–7.5% | $Sb_2O_3$ | 0–0.20% |
| $TiO_2$ | 0–2% | Pd | 1–6 ppm |
| $ZrO_2$ | 2–4.5% | | | plus 0–1.0% $Er_2O_3$ and/or 0–10 ppm Au, the mole ratio of $Li_2O:Na_2O$ being equal to or greater than 9:1 and the glass having a coloration in the fully darkened state corresponding to chromaticity coordinates, in accordance with the 1931 C.I.E. trichromatic colorimetric system, that fall within the trapezoid ABCDA in the drawing for a 1.1 mm glass thickness, and within the trapezoid EFGHE for a 2 mm glass thickness.

10 Claims, 1 Drawing Sheet

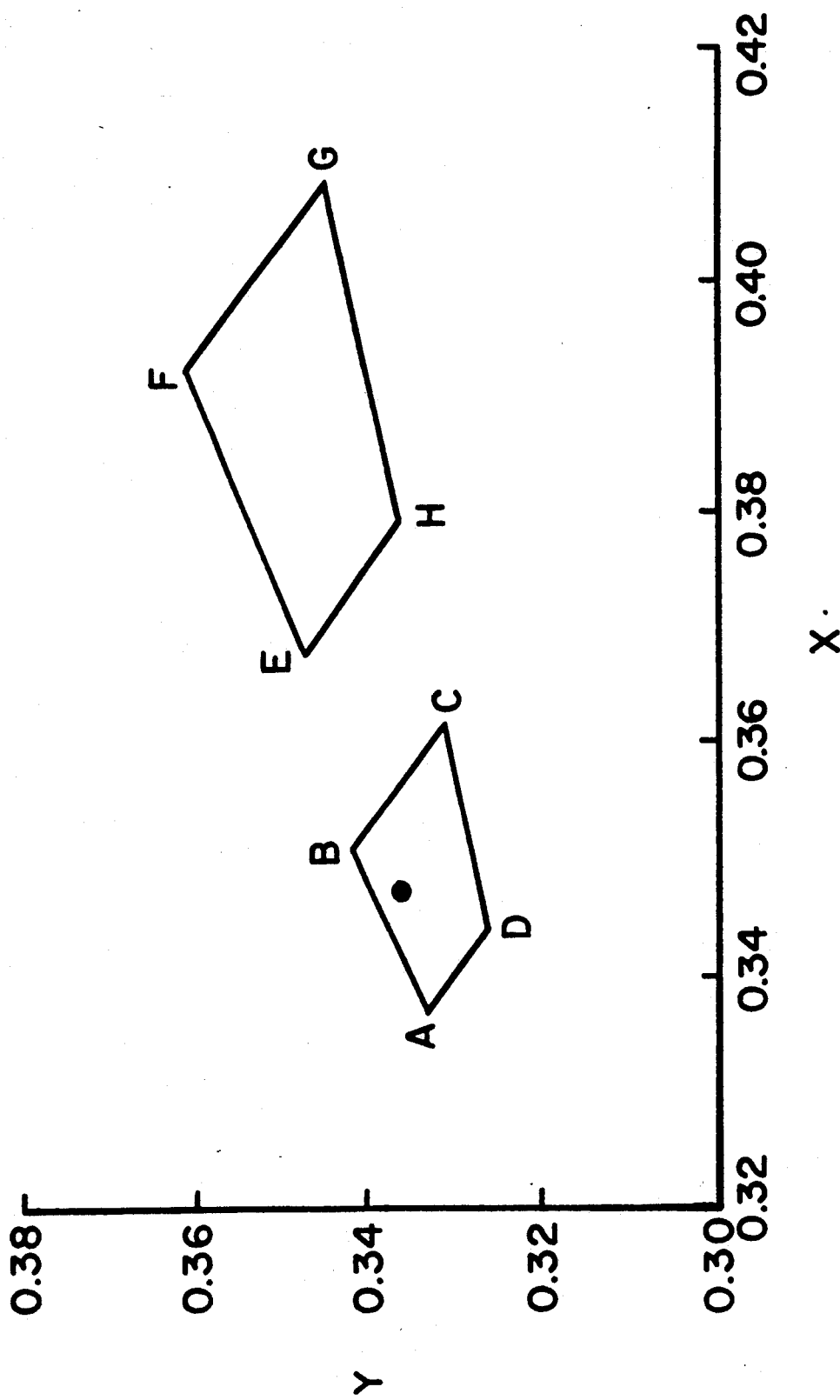

MULTIPURPOSE PHOTOCHROMIC BROWN GLASSES

FIELD OF THE INVENTION

The field is photochromic glasses that exhibit a brown color when darkened by exposure to actinic radiation.

BACKGROUND OF THE INVENTION

Photochromic (phototropic) glasses had their genesis in U.S. Pat. No. 3,208,860. That patent disclosed glasses demonstrating photochromic behavior, i.e., the glasses darken when exposed to actinic radiation, commonly ultraviolet radiation, and return to their original state when the radiation is removed. Such glasses are produced by developing therein crystallites of a silver halide selected from the group of AgCl, AgBr, and AgI. The preferred base glasses are stated to reside in the $R_2O$-$Al_2O_3$-$B_2O_3$-$SiO_2$ composition system.

Subsequent to that fundamental disclosure, intensive continuous research has been carried out to design glass compositions manifesting ever improved photochromic properties. The most extensive commercial application of photochromic glass has been in the field of spectacle lenses, both as prescription lenses and as non-prescription sunglasses. In view of that situation, research has focused principally on developing glasses which darken to a low luminous transmittance; which fade very rapidly to their original state; and which retain those darkening and fading characteristics over the range of temperatures commonly encountered by the wearer of spectacle lenses.

In recent years, organic plastic, non-photochromic lenses have made substantial inroads into both the prescription and non-prescription lens markets, principally because of the light weight of such lenses. Thus, the density of the plastic employed in such lenses is considerably less than glass used for the same purpose. Plastic lenses also possess the capability of being readily dyed. This imparts a permanent tint thereto with consequent reduction in transmittance. However, difficulty has been encountered in producing a practical photochromic lens from an organic plastic.

To gain the perceived advantage of lower weight, while enjoying the effect of photochromic behavior, laminated, glass-plastic lenses have been proposed. A number of U.S. patents disclose various laminated, glass-plastic, ophthalmic lens structures. A structure of current interest is disclosed, for example, in Fretz, Jr. U.S. Pat. No. 4,793,703. In general, the lens of that patent comprises a thin, inorganic glass lens, an organic plastic lens and an intermediate adhesive layer.

To achieve the desired weight advantage, the glass element will be as thin as possible consistent with the objective of achieving both satisfactory photochromic behavior and essential strength levels in the lens design. The conventional ophthalmic lens has a thickness of about 2 mm. It would, of course, be desirable to substantially reduce this thickness. However, as the cross section of a glass article is reduced, the transmittance thereof normally increases. Consequently, to be useful in thicknesses less than 2 mm, the composition of the photochromic glass must be designed to darken to a low luminous transmittance in thin cross sections while retaining the characteristics of fast fading and temperature independence.

Kerko et al. U.S. Pat. No. 4,608,349 is specifically directed to meet the need just expressed for a lightweight, photochromic glass lens that meets the requirements for photochromic behavior and strength. That patent prescribes a family of glasses having relatively narrow composition ranges. These ranges, in weight percent, are as follows:

| | |
|---|---|
| $SiO_2$ | 54–58% |
| $B_2O_3$ | 18–22% |
| $Al_2O_3$ | 7–8% |
| $Li_2O$ | 3.75–4.5% |
| $Na_2O$ | 0–1% |
| $K_2O$ | 5.5–7.5% |
| $TiO_2$ | 0–2% |
| $ZrO_2$ | 2–4.5% |
| Ag | 0.20–0.33% |
| Cl | 0.30–0.50% |
| Br | 0.04–0.12% |
| CuO | 0.007–0.012% |
| PbO | 0–0.08% |
| $Sb_2O_3$ | 0–0.20% |

The glasses have a $Li_2O$:$Na_2O$ molar ratio of at least 9:1, exhibit good photochromic and strengthening capabilities, and have an extremely neutral color in the darkened state. Neutral coloration is stated in the patent to mean a gray color that closely approximates the color of the standard light source, Illuminant C, as defined in terms of the 1931 C.I.E. trichromatic colorimetric system. The glasses are essentially uncolored in the undarkened state, having a luminous transmittance of 88–92%.

Over the years, there has been a continuing interest in developing a photochromic glass that would darken to a brown tint, rather than a neutral gray. DeMunn et al. U.S. Pat. No. 4,043,781 describes a method of developing photochromic glasses that darken to a brown color. The method requires subjecting glasses within a narrow composition range to a controlled heat treatment. Glasses thus produced were marketed under the registered trademark PHOTOBROWN.

Subsequently, it was learned that a variety of specific photochromic glasses could have a brown tint develop upon darkening. This required including in the glass batch one or more additives selected from the group including Pd, Au, $SNO_2$, $Fe_2O_3$, NiO, $Er_2O_3$, $Nd_2O_3$ and $Co_3O_4$. Such glasses are reported in Hares U.S. Pat. No. 4,251,278, Prassas U.S. Pat. No. 4,757,034 and Grateau et al. U.S. Pat. No. 5,023,029. However, these glasses were designed for use in standard, all-glass, 2 mm thick lenses. A glass lens in accordance with the Hares patent is currently marketed under the registered trademark PHOTOBROWN EXTRA.

There remains a need for a thin photochromic lens of about 1 mm thickness that will darken to a brown color, and that can be used as the glass lens element in the ophthalmic lens of the Fretz, Jr. patent. Stated otherwise, the need is for a lightweight, photochromic lens, as described in the Kerko et al. patent, that will darken to a brown color.

A basic purpose of our present invention is to meet that need. A byproduct is a new photochromic glass that is capable of functioning as a brown sunglass.

SUMMARY OF THE INVENTION

An aspect of our invention resides in a composition for a photochromic glass consisting essentially of, in approximate calculated weight percent, about:

| | | | |
|---|---|---|---|
| SiO$_2$ | 54–58% | Ag | 0.18–0.33% |
| B$_2$O$_3$ | 18–22% | Cl | 0.25–0.50% |
| Al$_2$O$_3$ | 7–8% | Br | 0.04–0.12% |
| Li$_2$O | 3.75–4.5% | CuO | 0.007–0.012% |
| Na$_2$O | 0–1% | PbO | 0–0.08% |
| K$_2$O | 5.5–7.5% | Sb$_2$O$_3$ | 0–0.20% |
| TiO$_2$ | 0–2% | Pd | 1–6 ppm |
| ZrO$_2$ | 2–4.5% | | | plus 0–1.0% Er$_2$O$_3$ and/or 0–10 ppm Au, the mole ratio of Li$_2$O:Na$_2$O being equal to or greater than 9:1 and the glass having a coloration in the fully darkened state corresponding to chromaticity coordinates, in accordance with the 1931 C.I.E. trichromatic colorimetric system, that fall within the trapezoid ABCDA in the drawing for a 1.1 mm glass thickness, and within the trapezoid EFGHE for a 2 mm glass thickness.

PRIOR ART

Prior art deemed most relevant has been mentioned in the Background section.

BRIEF DESCRIPTION OF THE DRAWINGS

The single FIGURE in the accompanying drawing is a graphical representation of chromaticity coordinates.

DESCRIPTION OF THE INVENTION

A photochromic glass, identified by Corning Incorporated as Code 8134, has a composition that falls within the ranges defined in the Kerko et al. −349 patent. In weight percent, as calculated from the glass batch, the composition of Code 8134 approximates:

| | |
|---|---|
| SiO$_2$ | 54.5 |
| B$_2$O$_3$ | 20.4 |
| Al$_2$O$_3$ | 7.3 |
| Li$_2$O | 4.3 |
| Na$_2$O | 0.8 |
| K$_2$O | 6.0 |
| TiO$_2$ | 1.0 |
| ZrO$_2$ | 4.7 |
| Ag | 0.25 |
| CuO | 0.008 |
| PbO | 0.03 |
| Sb$_2$O$_3$ | 0.01 |
| Br | 0.11 |
| Cl | 0.36 |

Code 8134 glass has been found to be particularly effective for production of a 1.1 mm thick glass lens used in a laminated structure, such as described in the Fretz, Jr. −703 patent. The unique feature of the glass is that it exhibits photochromic performance in a 1.1 mm lens that is equivalent to that normally attained in a 2 mm commercial glass identified as Code 8111. This unique capability enables producing a laminated, glass-plastic lens that is equivalent in performance to current all-glass photochromic lenses.

The present invention arose from efforts to develop a brown color in the Code 8134, 1.1 mm lens. As indicated earlier, the search was for means of imparting a darkened photochromic color comparable to the brown color currently available in the standard 2 mm PHOTOBROWN EXTRA lens marketed by Corning. The glass for that lens is Code 8111 glass having incorporated therein a minute amount of palladium (Pd) as disclosed in the Hares −278 patent. Code 8111 glass has the following composition in weight percent as analyzed:

| | |
|---|---|
| SiO$_2$ | 55.8 |
| Al$_2$O$_3$ | 6.48 |
| B$_2$O$_3$ | 18.0 |
| Li$_2$O | 1.88 |
| Na$_2$O | 4.04 |
| K$_2$O | 5.76 |
| ZrO$_2$ | 4.89 |
| TiO$_2$ | 2.17 |
| CuO | 0.011 |
| Ag | 0.24 |
| Cl | 0.20 |
| Br | 0.13 |

We have now discovered that the desired degree of brown coloration on darkening can be obtained in a 1.1 mm lens having a basic composition within the ranges defined in the −349 patent. Surprisingly, this is achieved by incorporating minute amounts of palladium (Pd) in the base glass. This finding was wholly unexpected since these additives had previously been used in other photochromic glasses. There, they produced a darkened brown color of desired depth in a 2 mm lens, but were relatively ineffective in a thinner 1.1 mm lens. In the thinner lens, they provided only a very light brown on darkening.

It is apparent that a synergistic effect of some nature occurs between the Pd additives and the Code 8134-type glass. What that effect is, we have not as yet ascertained. It may be speculated that it somehow influences the silver halide crystal formation, but we have no evidence to support this theory.

In accordance with our invention then, Pd in an amount of 1–6 ppm, preferably 2–4 ppm, is introduced as an additive to the batch for a photochromic glass having a composition as defined in the Kerko et al. −349 patent. Surprisingly, the depth of color obtainable upon darkening diminishes as the amount of Pd is increased. Also, there is a tendency for larger amounts to produce a fixed tint in the undarkened state. This fixed tint may be undesirable in comfort lenses.

The addition of Pd alone imparts a brown color on darkening of a glass. However, it is desirable, in some instances, to include Er$_2$O$_3$ and/or Au. Au tends to enhance the darkened color of the glass, and may be used where a deep color is desired. Er$_2$O$_3$ may have a slight effect on the darkened color. However, its primary effect is to impart a pleasing tint to the glass in the undarkened, or To, state.

We have further found that a greater degree of brown color is obtained in a darkened, 2 mm lens, as might be expected. Fortuitously, this greater degree of darkened color is sufficient to make the 2 mm lens a candidate for sunglass use. Consequently, our invention is applicable to varying glass thicknesses and fulfills multipurposes.

In general, the family of base glasses useful for present purposes corresponds to that set forth in the Kerko et al. U.S. Pat. No. 4,608,349. Thus, for either sunglass use, or for thin 1.1 mm lenses, the composition ranges of that patent preferably are adopted.

However, in certain prescription lenses, the thickness may vary considerably across a lens. For that product, we have found it necessary to employ lower amounts of Ag and/or Cl to maintain acceptable levels of darkening under all conditions.

Accordingly, the composition ranges for our present glass family, as calculated from glass batches, are essentially as follows in weight percent:

| | |
|---|---|
| SiO$_2$ | 54–58% |
| B$_2$O$_3$ | 18–22% |
| Al$_2$O$_3$ | 7–8% |
| Li$_2$O | 3.75–4.5% |
| Na$_2$O | 0–1% |
| K$_2$O | 5.5–7.5% |
| TiO$_2$ | 0–2% |
| ZrO$_2$ | 2–4.5% |
| Ag | 0.18–0.33% |
| Cl | 0.25–0.50% |
| Br | 0.04–0.12% |
| CuO | 0.007–0.012% |
| PbO | 0–0.08% |
| Sb$_2$O$_3$ | 0–0.20% |
| Pd | 1–6 ppm | plus 0–1.0% Er$_2$O$_3$ or 0–10 ppm Au.

The invention is further described with respect to specific examples. In each case, the commercial batch for Code 8134 glass was employed, and additions of Pd made thereto.

EXAMPLE I

Initial studies were made using Pd alone as the additive. Four two-lb. (0.9 kg) crucible melts were made with a different amount of Pd in each melt. In each case, the batch was melted at 1450° C. for 4 hours and then poured into molds to provide slabs for grinding and polishing to 2 mm thick samples for testing.

TABLE I shows the amount of Pd, in parts per million (ppm), that was added to each batch; also the chromaticity coordinates Y, x and y for each glass as measured on a Huntermeter. The measurements on each sample were made after the sample was exposed to ultraviolet radiation for 20 minutes.

TABLE I

| | 1 | 2 | 3 | 4 |
|---|---|---|---|---|
| Pd (ppm) | 0 | 1 | 2 | 4 |
| Y | 20 | 64.9 | 70.2 | 49.6 |
| x | 0.3175 | 0.3215 | 0.3194 | 0.3297 |
| y | 0.3131 | 0.3229 | 0.3243 | 0.3231 |

The samples containing Pd have higher x values, thus indicating a brown coloration. Also these glasses have substantially higher transmittance as indicated by Y values. The lack of consistency in the measurements, and the low coordinate values, appears to be the result of sensitivity to the oxidation state of the melt. As is well known, it is difficult to control the oxidation state in crucible melts. Nevertheless, these melts do show that a brown color is obtained in the darkened state in the particular base glass. This color may be deepened by controlling the oxidation level during melting, for example, by use of the reducing agent, antimony oxide, in the batch.

EXAMPLE II

Additional crucible melts were made in which Er$_2$O$_3$ or Au was combined with Pd as the additive. TABLE II shows the amount of Pd in ppm; the amount of Er$_2$O$_3$ in weight percent; the amount of Au in ppm. Samples were prepared from the melts and chromaticity coordinates measured. The measured values are shown.

TABLE II

| Pd (ppm) | 3 | 3 | 2 | 2 |
|---|---|---|---|---|
| Er$_2$O$_3$ | — | 0.25 | — | — |
| Au (ppm) | — | — | 10 | 2 |
| Y | 22.7 | 44.3 | 18.5 | 34.9 |
| x | 0.3396 | 0.3273 | 0.3645 | 0.3440 |
| y | 0.3278 | 0.3208 | 0.3362 | 0.3258 |

Er$_2$O$_3$ tends to have little effect on the chromaticity coordinates. Visually, the glass exhibits a reddish-brown color. Gold additives enhance the darkened brown as indicated. However, they also tend to impart a fixed tint, that is, a brown tint in the undarkened glass.

EXAMPLE III

In an effort to obtain more controlled melting conditions, two eight-hour excursions were made in a continuous melting unit operating with a cold crown. This unit operates at about 1450° C. and delivers about 20 lbs (9.1 kgs) of glass an hour. Variations in Pd additions were made during each run. Samples were taken at half hour intervals for chromaticity coordinate measurements on both 2 mm and 1.1 mm glass thicknesses.

Representative data are reported in TABLE III. The first set of data represents measurements on 2 mm thick samples; the second set on 1.1 mm thick samples. It is apparent that deeper brown colors are obtained at the lower Pd levels with a range of 2–4 ppm being preferred.

TABLE III

| Pd | 14 | 4 | 9 | 4 | 3 | 1 |
|---|---|---|---|---|---|---|
| Er$_2$O$_3$ | 0.25 | 0.25 | 0.25 | 0.25 | 0.25 | 0.25 |
| 2 mm | | | | | | |
| Y | 26.2 | 22.3 | 23.8 | 31.4 | 27.3 | 23.4 |
| x | 3425 | 3642 | 3452 | 3514 | 3725 | 3708 |
| y | 3236 | 3376 | 3226 | 3367 | 3464 | 3446 |
| 1.1 mm | | | | | | |
| Y | 38.8 | 26.6 | 32.0 | 45.7 | 32.8 | 28.7 |
| x | 3323 | 3516 | 3356 | 3442 | 3575 | 3641 |
| y | 3224 | 3304 | 3197 | 3350 | 3394 | 3428 |

For comparison, 2 mm thick PHOTOBROWN EXTRA lenses have an x value of 0.3475 and a y value of 0.3360 when similarly darkened. This indicates that addition of 2–4 ppm Pd to a Code 8134 lens of 1.1 mm thickness provides a deep brown darkened color comparable to that obtained in a 2 mm PHOTOBROWN EXTRA lens. It also indicates a very strong, darkened, brown color in a 2 mm lens that is desirable for sunglass purposes.

The single FIGURE in the drawing is a plot of chromaticity coordinates wherein x values are plotted on the horizontal axis and y values on the vertical axis. Trapezoid ABCDA represents acceptable values for a brown 1.1 mm lens, while trapezoid EFGHE represents acceptable values for a 2 mm sunglass lens. Also, shown by a filled circle are the corresponding values for a 2 mm PHOTOBROWN EXTRA lens.

The approximate coordinate values for the corner points of the two trapezoidal enclosures are as follows:

| Point | x | y |
|---|---|---|
| A | 0.3377 | 0.3337 |
| B | 0.3513 | 0.3422 |
| C | 0.3617 | 0.3315 |
| D | 0.3446 | 0.3265 |
| E | 0.3683 | 0.3478 |
| F | 0.3923 | 0.3613 |
| G | 0.4081 | 0.3452 |
| H | 0.3795 | 0.3365 |

We claim:

1. A composition for a photochromic glass consisting essentially of, in approximate calculated weight percent, about:

| | | | |
|---|---|---|---|
| SiO$_2$ | 54–58% | Ag | 0.18–0.33% |
| B$_2$O$_3$ | 18–22% | Cl | 0.25–0.50% |
| Al$_2$O$_3$ | 7–8% | Br | 0.04–0.12% |
| Li$_2$O | 3.75–4.5% | CuO | 0.007–0.012% |
| Na$_2$O | 0–1% | PbO | 0–0.08% |
| K$_2$O | 5.5–7.5% | Sb$_2$O$_3$ | 0–0.20% |
| TiO$_2$ | 0–2% | Pd | 1–6 ppm |
| ZrO$_2$ | 2–4.5% | | | plus 0–1.0% Er$_2$O$_3$ and/or 0–10 ppm Au, the mole ratio of Li$_2$O:Na$_2$O being equal to or greater than 9:1 and the glass having a coloration in the fully darkened state corresponding to chromaticity coordinates, in accordance with the 1931 C.I.E. trichromatic colorimetric system, that fall within the trapezoid ABCDA in the drawing for a 1.1 mm glass thickness, and within the trapezoid EFGHE for a 2 mm glass thickness.

2. A composition in accordance with claim 1 wherein the glass contains 0–1% Er$_2$O$_3$.

3. A composition in accordance with claim 1 wherein the glass contains 0–10 ppm Au.

4. A composition in accordance with claim 1 wherein the Ag content is 0.20–0.33% and the Cl content is 0.30–0.50%.

5. A composition in accordance with claim 1 wherein the Pd content is 2–4 ppm.

6. A composition in accordance with claim 1 consisting approximately of:

| | |
|---|---|
| SiO$_2$ | 54.5 |
| B$_2$O$_3$ | 20.4 |
| Al$_2$O$_3$ | 7.3 |
| Li$_2$O | 4.3 |
| Na$_2$O | 0.8 |
| K$_2$O | 6.0 |
| TiO$_2$ | 1.0 |
| ZrO$_2$ | 4.7 |
| Ag | 0.25 |
| CuO | 0.008 |
| PbO | 0.03 |
| Sb$_2$O$_3$ | 0.01 |
| Br | 0.11 |
| Cl | 0.36 |
| Pd | 3 ppm. |

7. A photochromic glass lens having a glass composition consisting essentially of, in approximate calculated weight percent, about:

| | | | |
|---|---|---|---|
| SiO$_2$ | 54–58% | Ag | 0.18–0.33% |
| B$_2$O$_3$ | 18–22% | Cl | 0.25–0.50% |
| Al$_2$O$_3$ | 7–8% | Br | 0.04–0.12% |
| Li$_2$O | 3.75–4.5% | CuO | 0.007–0.012% |
| Na$_2$O | 0–1% | PbO | 0–0.08% |
| K$_2$O | 5.5–7.5% | Sb$_2$O$_3$ | 0–0.20% |
| TiO$_2$ | 0–2% | Pd | 1–6 ppm |
| ZrO$_2$ | 2–4.5% | | | plus 0–1.0% Er$_2$O$_3$ and/or 0–10 ppm Au, the mole ratio of Li$_2$O:Na$_2$O being equal to or greater than 9:1 and the glass having a coloration in the fully darkened state corresponding to chromaticity coordinates, in accordance with the 1931 C.I.E. trichromatic colorimetric system, that fall within the trapezoid ABCDA in the drawing for a 1.1 mm glass thickness, and within the trapezoid EFGHE for a 2 mm glass thickness.

8. A lens in accordance with claim 7 wherein the lens thickness is about 1.1 mm and the chromaticity coordinates fall within the trapezoid ABCDA in the drawing.

9. A lens in accordance with claim 7 wherein the lens thickness is about 2 mm and the chromaticity coordinates fall within the trapezoid EFGHE in the drawing.

10. A laminated, glass-plastic, ophthalmic lens wherein the glass element has a composition consisting essentially of, in approximate calculated weight percent, about

| | |
|---|---|
| SiO$_2$ | 54–58% |
| B$_2$O$_3$ | 18–22% |
| Al$_2$O$_3$ | 7–8% |
| Li$_2$O | 3.75–4.5% |
| Na$_2$O | 0–1% |
| K$_2$O | 5.5–7.5% |
| TiO$_2$ | 0–2% |
| ZrO$_2$ | 2–4.5% |
| Ag | 0.20–0.33% |
| Cl | 0.30–0.50% |
| Br | 0.04–0.12% |
| CuO | 0.007–0.012% |
| PbO | 0–0.08% |
| Sb$_2$O$_3$ | 0–0.20% |
| Pd | 1–6 ppm | plus 0–1.0% Er$_2$O$_3$ and/or 0–10 ppm Au, the mole ratio of Li$_2$O:Na$_2$O being equal to or greater than 9:1 and the glass having a coloration in the fully darkened state corresponding to chromaticity coordinates, in accordance with the 1931 C.I.E. trichromatic colorimetric system, that fall within the trapezoid ABCDA in the drawing for a 1.1 mm glass thickness.

* * * * *